May 25, 1971     J. E. ASMUTH     3,580,797
TABLE COVER
Filed Aug. 22, 1969
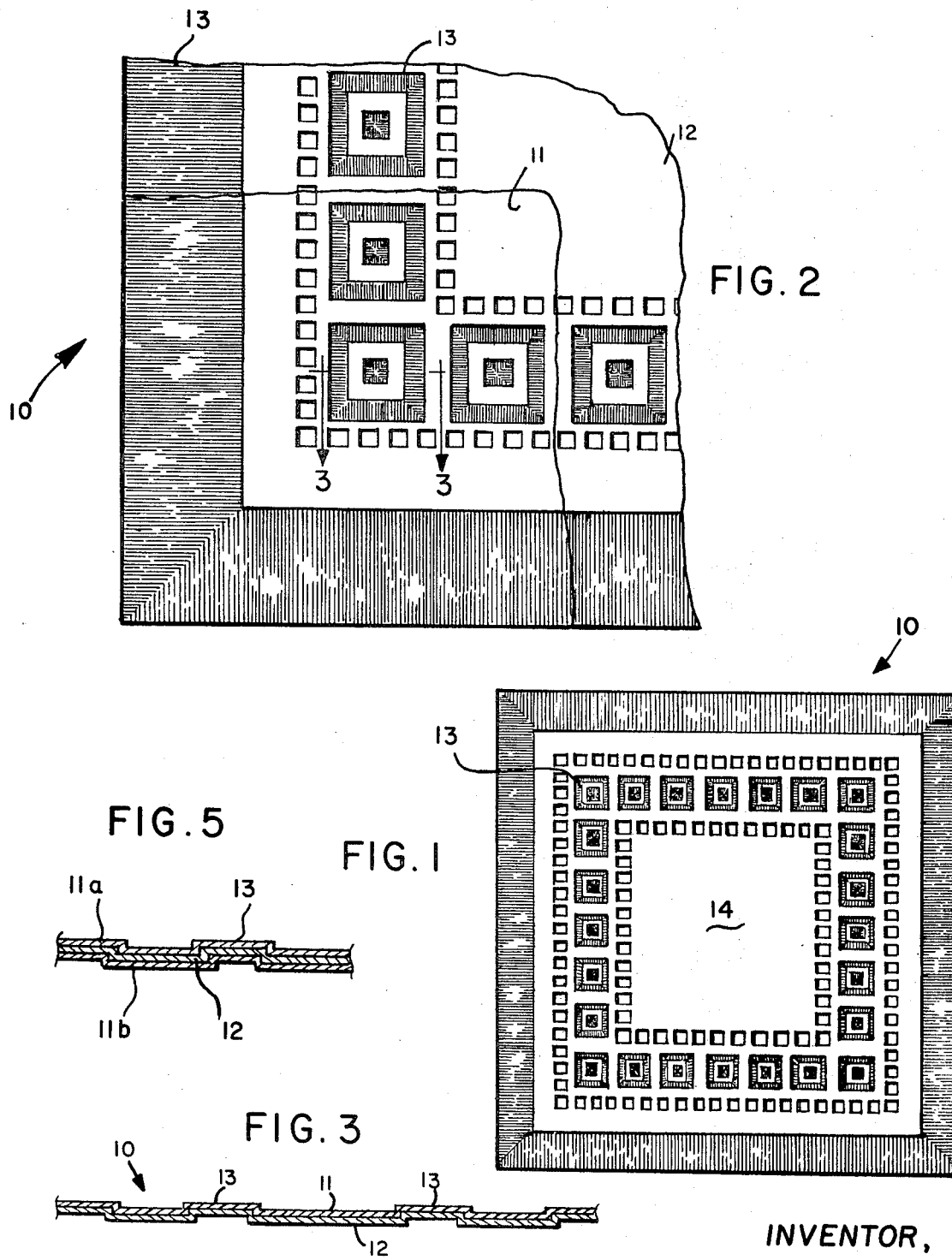
INVENTOR,
JAMES E. ASMUTH
By Fred Winnott
Attorney United States Patent Office 3,580,797
Patented May 25, 1971

3,580,797
TABLE COVER
James E. Asmuth, Neenah, Wis., assignor to Wisconsin Tissue Mills, Menasha, Wis.
Filed Aug. 22, 1969, Ser. No. 852,390
Int. Cl. B32b 1/00, 3/02
U.S. Cl. 161—126                              4 Claims

ABSTRACT OF THE DISCLOSURE

A table cover comprising at least one ply of thin cellulosic tissue and an additional ply of thin polyethylene film which is superimposed in an edge aligned relation with the first ply. The plies are secured in a laminated relation by embossing in areas of substantial width extending along the marginal edges to form a border for the table cover and to completely surround a central area which is substantially free of embossing. The border forming embossed marginal areas are of substantially uniform width and extend inwardly along the opposite side edges of the table cover from the original untrimmed marginal side edges.

BACKGROUND OF THE INVENTION

This invention relates to disposable table coverings.

Disposable paper table coverings are well known in the prior art and generally include a plurality of plies of relatively thin cellulosic tissue material secured in laminated relation by an edge embossment. Relatively thin material is imployed so that the articles will have a soft texture but this requires a plurality of plies of the material in order to provide the article with the requisite strength and thickness. Such table covers, however, have not been wholly satisfactory because the plies tend to delaminate. In addition, because such prior art table covers are relatively light weight and do not cohere readily to table surfaces because of the textured nature of the material, they tend to be easily blown from the table surface when used outdoors or in other areas exposed to the wind. Furthermore, such prior art table coverings were not wholly satisfactory because they could not provide any degree of protection against spilled liquids.

SUMMARY OF THE INVENTION

It is an object of the invention to provide a disposable table cover comprising a plurality of plies of relatively thin material joined by edge embossing which is not subject to delamination.

Another object of the invention is to provide a disposable table cover which does not readily slip along the covered surface.

A further object of the invention is to provide a disposable table covering which protects the covered surface from fluids which may be spilled.

These and other objects and advantages of the instant invention are provided by a disposable table covering consisting of at least one ply of a relatively thin cellulosic tissue material and an additional ply of a relatively thin film of plastic material which are secured in a laminated relation by embossing in areas of substantial width extending along the marginal edges of the members wherein the embossed areas form a border of the cover and completely surround a center area which is substantially free of embossing.

BRIEF DESCRIPTION OF THE DRAWINGS

FIG. 1 is a plan view of a table covering according to the instant invention;

FIG. 2 is an enlarged fragmentary view of a portion of the table covering shown in FIG. 1 and illustrating the edge embossing thereof in greater detail;

FIG. 3 is a view taken along lines 3—3 of FIG. 2;

FIGS. 4 and 5 are fragmentary sectional views of alternate embodiments of the instant invention.

DESCRIPTION OF THE PREFERRED EMBODIMENTS

FIGS. 1–3 show a disposable table cover 10 according to the preferred embodiment of the instant invention as including a first ply 11 of a relatively thin tissue paper and a second ply 12 of a relatively thin plastic material, such as polyethylene film. The tissue may be 14–25 pound material on the basis of 500 sheets 24" x 36" in size. The polyethylene film may be in the order of 0.5 mil in thickness. The plies 11 and 12 are substantially co-extensive and are secured in a laminated relation by means of embossing 13 formed along the marginal edges of the table cover and which is formed in any suitable decorative pattern. The embossing 13 is formed by passing the plies 11 and 12 between cooperating forming rollers or mandrels (not shown) having suitable coacting elevated and depressed areas which upset the plies 11 and 12 and force small areas of the material one into the other as shown in FIG. 3. Because of the plastic nature of the polyethylene material 12 it closely adheres to the surface of the tissue material 11 at the embossing 13 so as to form a relatively good bond which does not readily tend to delaminate.

Apparatus for forming the embossing 13 in multi-ply materials such as the table covering 10, are well known in the art and will not be discussed in detail for the sake of brevity. While any suitable pattern may be provided by the embossing 13, preferably they extend to the outer marginal edges of the laminates 11 and 12, and extend for an appreciable distance toward the center thereof as well. This tends to inhibit delamination or peeling.

The central section 14 of the table covering 10 is shown in FIG. 1 to be generally free of embossing. Such large unembossed areas are preferable because the relatively free polyethylene film will have the greater tendency to adhere to the surfaces being covered both so as to prevent the table cover from sliding and also from being blown off if employed in an area exposed to the wind.

Table cover 10, according to the preferred embodiment of the invention, is relatively strong, tends to cling to the surface being covered and to protect the same from spilled liquids, and does not readily delaminate.

The tissue ply 11 additionally provides the table covering with a relatively soft texture. This softness may be increased by providing a plurality of tissue plies 11a and 11b as shown in the alternate embodiment of the table covering 10 shown in FIGS. 4 and 5. Here the thinner plies could have a weight, for example, of approximately 10 pounds on a basis of 500 sheets of 24" x 36" in size. In FIG. 4 both tissue plies 11a and 11b are shown to be disposed on the same side of the plastic 12, and in FIG. 5, the tissue plies 11a and 11b are shown to be disposed on the opposite sides thereof. The latter embodiment allows the table cover 10 to be used after the upper layer of tissue becomes soiled merely by turning the cover over. In addition, because both plies of tissue 11a and 11b are in contact with the plastic 12, there will be less tendency to delaminate. Further, with the embodiment of FIG. 5, the layer of tissue 11a or 11b will minimize the tendency for the plastic to adhere to the table in the event a heated article is placed thereon.

While the invention has been illustrated and described with the various layers of substantially the same size, any of the layers of tissue or plastic may be somewhat larger to facilitate production and to minimize end curling or for reasons of appearance or otherwise. Also while only three embodiments of the invention have been shown and described and while the invention has been described with

I claim:

1. A table covering comprising at least one ply of thin cellulosic tissue and an additional generally edge aligned ply of thin pliable plastic film for closely assuming the configuration of any supporting surface, said plies being being secured in a laminated relation by embossing areas of the marginal edges thereof, said embossment having a substantial width and extending completely around the edge of said covering, said embossments upsetting the plies of material to force the same into a bonding relation and to provide a decorative pattern for said covering, the central area of said covering surrounded by said embossed areas being substantially free of embossing, said plastic film being characterized by a tendency to cling to the surface being covered and of resisting moisture penetration.

2. The table covering set forth in claim 1, wherein said plastic material comprises a thin polyethylene film.

3. The table covering set forth in claim 2 and including at least two plies of said cellulosic material disposed on the opposite sides of said plastic film.

4. The table covering set forth in claim 2, and including at least two plies of said cellulosic material disposed on the same side of said plastic film.

References Cited

UNITED STATES PATENTS

| | | | |
|---|---|---|---|
| 1,201,701 | 10/1916 | Crane | 161—124 |
| 1,755,744 | 4/1930 | Munktell | 161—135X |
| 2,004,166 | 6/1935 | Low | 161—149UX |
| 2,897,109 | 7/1959 | Voigtman | 161—Emboss Dig. |
| 3,024,154 | 3/1962 | Singleton et al. | 156—209 |

WILLIAM A. POWELL, Primary Examiner

U.S. Cl. X.R.

161—138, 147, 149, 413